(12) United States Patent
Jaiswal et al.

(10) Patent No.: US 10,291,738 B1
(45) Date of Patent: May 14, 2019

(54) SPECULATIVE PREFETCH OF RESOURCES ACROSS PAGE LOADS

(71) Applicant: Instart Logic, Inc., Palo Alto, CA (US)

(72) Inventors: Sharad Jaiswal, Cupertino, CA (US); Hariharan Kolam, San Ramon, CA (US); Mehrdad Reshadi, Sunnyvale, CA (US)

(73) Assignee: Instart Logic, Inc., Palo Alto, CA (US)

( * ) Notice: Subject to any disclaimer, the term of this patent is extended or adjusted under 35 U.S.C. 154(b) by 196 days.

(21) Appl. No.: 15/412,716

(22) Filed: Jan. 23, 2017

Related U.S. Application Data

(60) Provisional application No. 62/281,666, filed on Jan. 21, 2016.

(51) Int. Cl.
| | | |
|---|---|---|
| *G06F 13/00* | (2006.01) | |
| *H04L 29/08* | (2006.01) | |
| *G06F 17/22* | (2006.01) | |

(52) U.S. Cl.
CPC ...... *H04L 67/2847* (2013.01); *G06F 17/2247* (2013.01); *H04L 67/02* (2013.01)

(58) Field of Classification Search
CPC .... G06F 8/4442; G06F 9/3814; G06F 9/3816; G06F 12/0862; G06F 17/2247; H04L 67/2842; H04L 67/2847; H04L 67/02
USPC .......................... 709/217–219, 203, 230–235
See application file for complete search history.

(56) References Cited

U.S. PATENT DOCUMENTS

| | | | | |
|---|---|---|---|---|
| 8,099,492 | B2 * | 1/2012 | Dahlin ................... | H04L 29/06 370/229 |
| 8,176,141 | B1 * | 5/2012 | Lambert ............. | H04L 67/2847 370/230 |
| 8,549,099 | B2 * | 10/2013 | Sebastian .......... | G06F 17/30887 709/217 |
| 8,984,048 | B1 * | 3/2015 | Maniscalco ......... | H04L 67/2847 709/203 |
| 8,984,095 | B2 * | 3/2015 | Sebastian .......... | G06F 17/30887 709/217 |
| 9,043,385 | B1 * | 5/2015 | Lepeska ............ | G06F 17/30902 709/203 |
| 9,407,717 | B1 * | 8/2016 | Maniscalco ......... | H04L 67/2847 |
| 10,171,550 | B1 * | 1/2019 | Lepeska ............. | H04L 67/2847 |
| 2008/0313328 | A1 * | 12/2008 | Dahlin ................... | H04L 29/06 709/224 |

(Continued)

*Primary Examiner* — Kenneth R Coulter
(74) *Attorney, Agent, or Firm* — Van Pelt, Yi & James LLP

(57) ABSTRACT

A plurality of sets of information is received, wherein each set of information indicates dependent resources of a corresponding referred web content, wherein each set of information is collected in response to the corresponding referred web content having been loaded on one of one or more client devices. The received sets of information associated with the corresponding referred web content are used to update a list of candidate prefetchable resources for a referring web content that refers to the corresponding referred web content. A request requesting for a list of prefetchable resources is received from a requestor, wherein the request is associated with loading the referring web content on the requestor's client device. One or more resources from the list of candidate prefetchable resources are selected as prefetchable resources based on one or more criteria. One or more identifiers identifying the one or more selected resources are sent.

24 Claims, 9 Drawing Sheets

(56) References Cited

U.S. PATENT DOCUMENTS

2010/0146415 A1\* 6/2010 Lepeska .................. G06F 17/30
 715/760
2010/0180082 A1\* 7/2010 Sebastian ................ H04L 67/02
 711/126

\* cited by examiner

```
<html>
  <head>
    <title>Welcome</title>
  </head>
  <body>
    <h1>HelloWorld </h1>
         .
         .
         .
    <img src = "url for image"/>
    <video>
        <source src = "url for video" type = "video/ogg"  />
    </video>
    <script type = "text/javascript">
    <!--script
    *** Some javascript code is placed here ***
    -->
    </script>
  </body>
</html>
```

Script

SPECULATIVE PREFETCH OF RESOURCES ACROSS PAGE LOADS

CROSS REFERENCE TO OTHER APPLICATIONS

This application claims priority to U.S. Provisional Patent Application No. 62/281,666 entitled SPECULATIVE PREFETCH OF RESOURCES ACROSS PAGE LOADS filed Jan. 21, 2016 which is incorporated herein by reference for all purposes.

BACKGROUND OF THE INVENTION

Prefetching is one technique that may be used to speed up the loading of webpages. By prefetching and caching content such as webpages or dependent resources (e.g., audio, video, image, and JavaScript files), the content can be quickly served out of a browser cache on a user device, thereby reducing overall network delay and loading time. Different browsers have provided different mechanisms for a web application to suggest resources to prefetch. In order for a web application to use these mechanisms, the web application designer typically takes the approach of predicting webpage transitions. However, predicting webpage transitions is increasing challenging, because the page URLs (uniform resource locators) themselves may be changing across users or requests. Furthermore, making wrong webpage transition predictions can be wasteful for a user's bandwidth. Therefore, improved techniques for prefetching content are desirable.

BRIEF DESCRIPTION OF THE DRAWINGS

Various embodiments of the invention are disclosed in the following detailed description and the accompanying drawings.

FIG. 2 is a diagram illustrating an embodiment of a webpage 200 described by an HTML file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
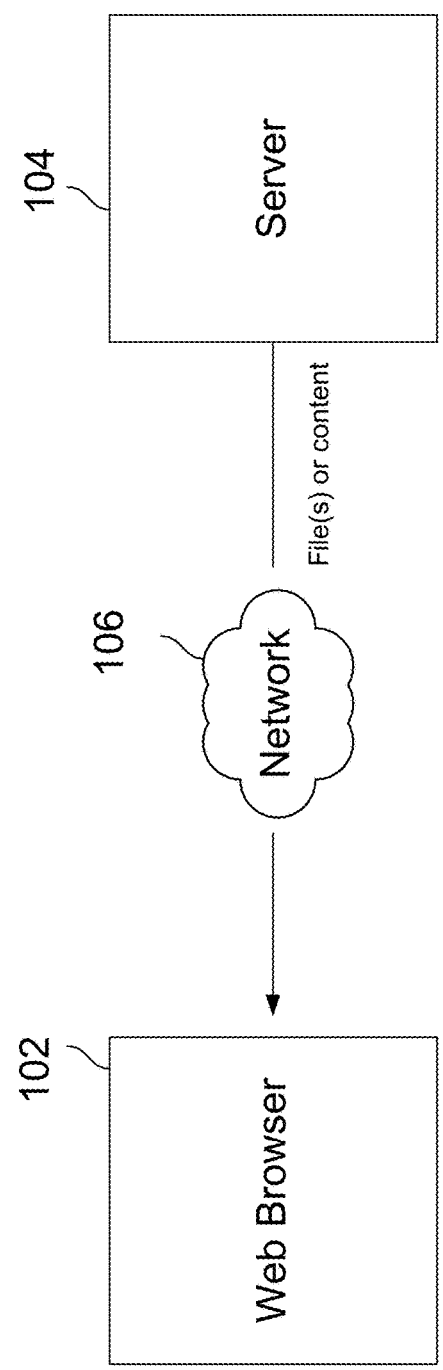
FIG. 1 is a block diagram illustrating an embodiment of a web browser running a web application.

FIG. 1 is a block diagram illustrating an embodiment of a web browser running a web application. The web browser accesses webpages and other information through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components of the webpage in a local memory.

The Document Object Model (DOM) is a standardized model supported by different web browsers, e.g., Internet Explorer, Firefox, and Google Chrome, for representing the various components of a webpage. The DOM is a cross-platform and language-independent convention for representing and interacting with objects in HTML documents as well as XHTML and XML documents. Objects in a DOM tree may be addressed and manipulated using methods on the objects. The public interface of a DOM is specified in its application programming interfaces (APIs), known as the DOM APIs.

The DOM standard includes different levels. DOM core level 0 and level 1 are the core standards supported by all web browsers. DOM levels 2 and above are extensions to DOM core level 0 and level 1, which can be optionally supported by different web browsers. DOM core level 0 and level 1 define a minimal set of objects and interfaces for accessing and manipulating document objects. The DOM provides a complete model for an entire HTML document, including the means to change any portion of the document.

The DOM standard represents documents as a hierarchy of node objects, called a DOM tree. Within the document structure hierarchy, some types of nodes may have child nodes of various types, while other nodes are leaf nodes that cannot have any object below them.

Figure 3:
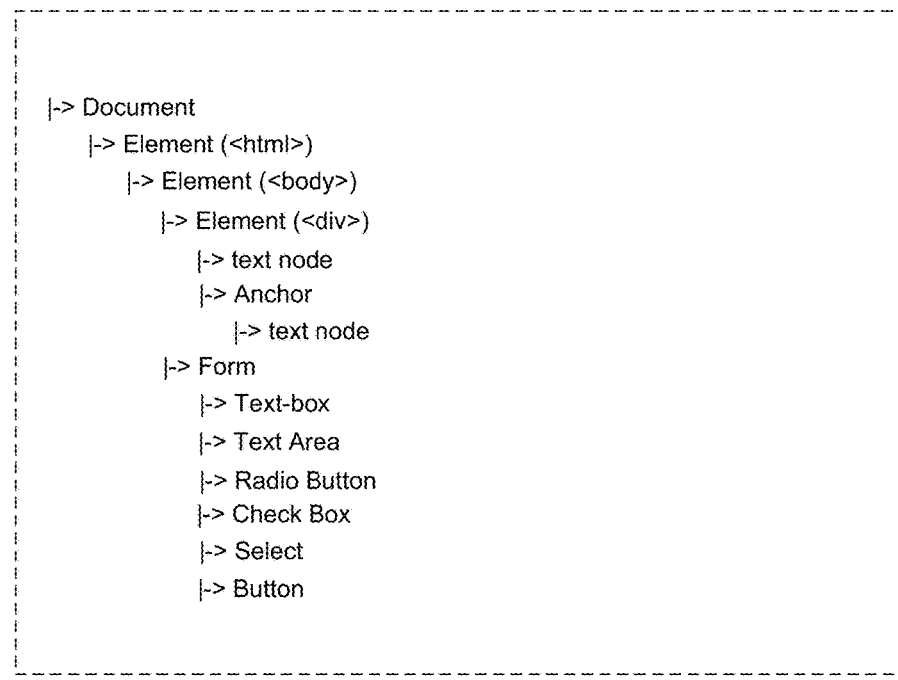
FIG. 3 is a diagram illustrating an embodiment of a DOM tree 300.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components of webpage 200 in a local memory. For example, when the image tag (shown as <img src="url for image"/> in FIG. 2) is parsed by web browser 102, the image is represented as an image object, and the image object is accordingly inserted into the DOM tree.

After the webpage file is parsed and the corresponding DOM tree is created, the entire DOM tree can be traversed to retrieve any dependent resources (e.g., images, JavaScripts, audio clips, or videos) indicated by any of the nodes in the DOM tree via a network. For example, the image object corresponding to the image tag in webpage 200 redirects web browser 102 to fetch an image file from an uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by JavaScript. In response to the request, the requested dependent resource is sent to web browser 102 via a network.

A web application may include scripts that are executed when different DOM events occur. DOM event APIs allow event-driven programming languages (e.g., JavaScript, Jscript, ECMAScript, VBScript, and Java) to register various DOM event handlers/listeners with the element nodes inside a DOM tree. Different types of events can be generated by the element nodes inside a DOM tree, including mouse events, keyboard events, HTML frame/object events, HTML form events, user interface events, mutation events, progress events, and the like. For example, the DOM event API "onclick" is triggered when a user clicks on an element, and a script that has registered as a callback script for the "onclick" event will be executed. In another example, the DOM event APIs "onKeyDown" and "onKeyup" are triggered when a user presses a key and releases a key, respectively. In another example, the DOM event API "oninput" is triggered when an element receives user inputs.

Figure 4:
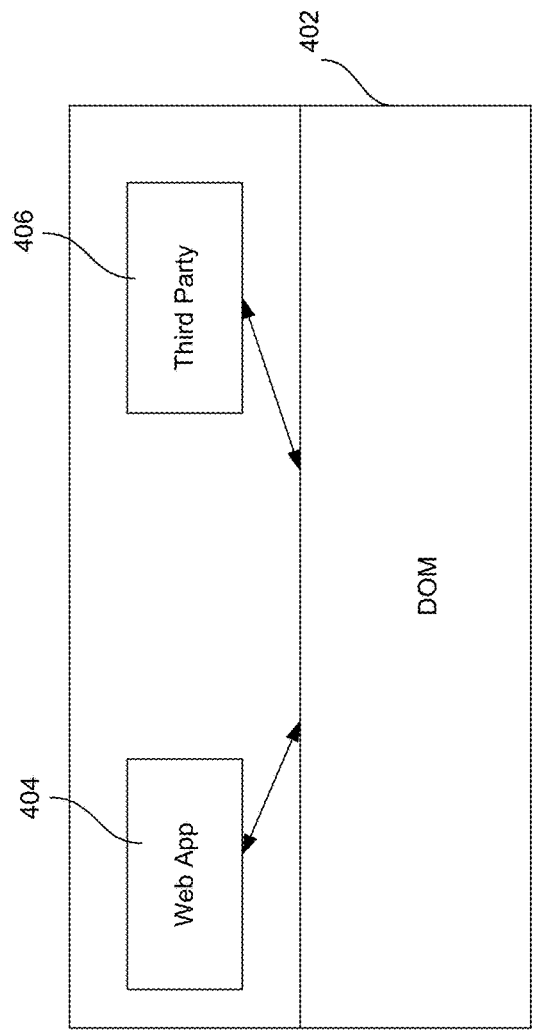
FIG. 4 illustrates that the DOM 402 may be accessed by a web application 404 and its scripts, and also by any legitimate third-party scripts, code or libraries (406).

FIG. 4 illustrates that the DOM 402 may be accessed by a web application 404 and its scripts, and also by any legitimate third-party scripts, code or libraries (406).

With continued reference to FIGS. 1 and 2, since web browser 102 needs to receive webpage 200 and its dependent resources (resources that are referenced by the webpage) before web browser 102 can complete the rendering of webpage 200 and the network latency associated with different types of networks varies widely, the webpage loading wait time experienced by the end-user of the browsing session may be insignificant in low-latency networks, but unacceptably long for an end-user in higher-latency networks.

Traditionally, prefetching is one technique that may be used to speed up the loading of webpages. By prefetching and caching content such as webpages or dependent resources (e.g., audio, video, image, and JavaScript files), the content can be quickly served out of a browser cache on a user device, thereby reducing overall network delay and loading time. Different browsers have provided different mechanisms for a web application to suggest resources to prefetch. For example, most modern browsers (e.g., Google Chrome, Internet Explorer, and Mozilla Firefox) support standard link prefetching via the <link rel="prefetch"> tag and prerendering via the <link rel="prerender"> tag. In order for a web application to use these tags, the web application designer typically takes the approach of predicting user actions. For example, the web application designer predicts which webpage a user is likely to browse to next, and then prefetches that webpage and its corresponding dependent resources (i.e., the resources that are referenced by the webpage). However, predicting webpage transitions is increasing challenging, because the webpage URLs themselves may change across users or requests. Furthermore, making erroneous webpage transition predictions can waste a user's bandwidth. In addition, only the web application designer of the content provider may determine the content to prefetch by making code changes in the webpages. Therefore, improved techniques for prefetching content are desirable.

In the present application, an improved technique for identifying prefetchable resources is disclosed. The technique is also referred to as Page Resource Prefetch (PREP) or Multi-Page Resource Prefetch (MRPP). Instead of predicting webpage transitions, the improved technique infers which resources will occur with high probabilities in one or more webpage transitions. For example, suppose that the present webpage is P, and the list of any possible outgoing webpage that webpage P may transition into includes candidate webpages $C_1, C_2 \ldots$ and $C_N$. Instead of predicting the probability of transitioning from webpage P to any particular webpage $C_i$, the present technique computes the probability of occurrence of any candidate resource $R_j$ in any possible candidate webpage $C_i$. The problem thus changes from predicting webpage transitions based on user intent (which is a difficult problem) to predicting resources by also considering the underlying structure of the webpages within the website. More specifically, a particular website usually organizes its content in a certain hierarchical structure, and the structure of the website may be utilized in predicting the prefetchable resources. For example, an online merchant website may have a product menu that leads to a plurality of webpages, with descriptions of products in different product categories (e.g., consumer electronics, books, and toys). Webpages at the same hierarchical level often share similar resources, including JavaScripts, style sheets, images, and the like. Therefore, there may be common resources that will each occur with a high probability no matter which webpage the user chooses to browse into next from a given webpage, and these common resources may be identified reliably as prefetchable resources using the present technique.

Another advantage of the improved technique disclosed in the present application is that the prefetching does not require any code changes made by the web application designer or any involvement by the web application publisher. PREP may be performed by a proxy server, a PREP service server, and a client running on the client device. PREP utilizes a client running on the client device because a proxy server may have difficulties accessing some webpages and the resources within the webpages. For example, many webpages are not accessible without the right cookies or request headers, because of security concerns. Therefore, a proxy server may not be able to determine the resources within a webpage. A client running on the client device (also referred to as a virtualization client or Nanovisor) is therefore used to determine the resources in a webpage and the resources' respective downloading timing information, as will be described in greater detail below.

Figure 5:
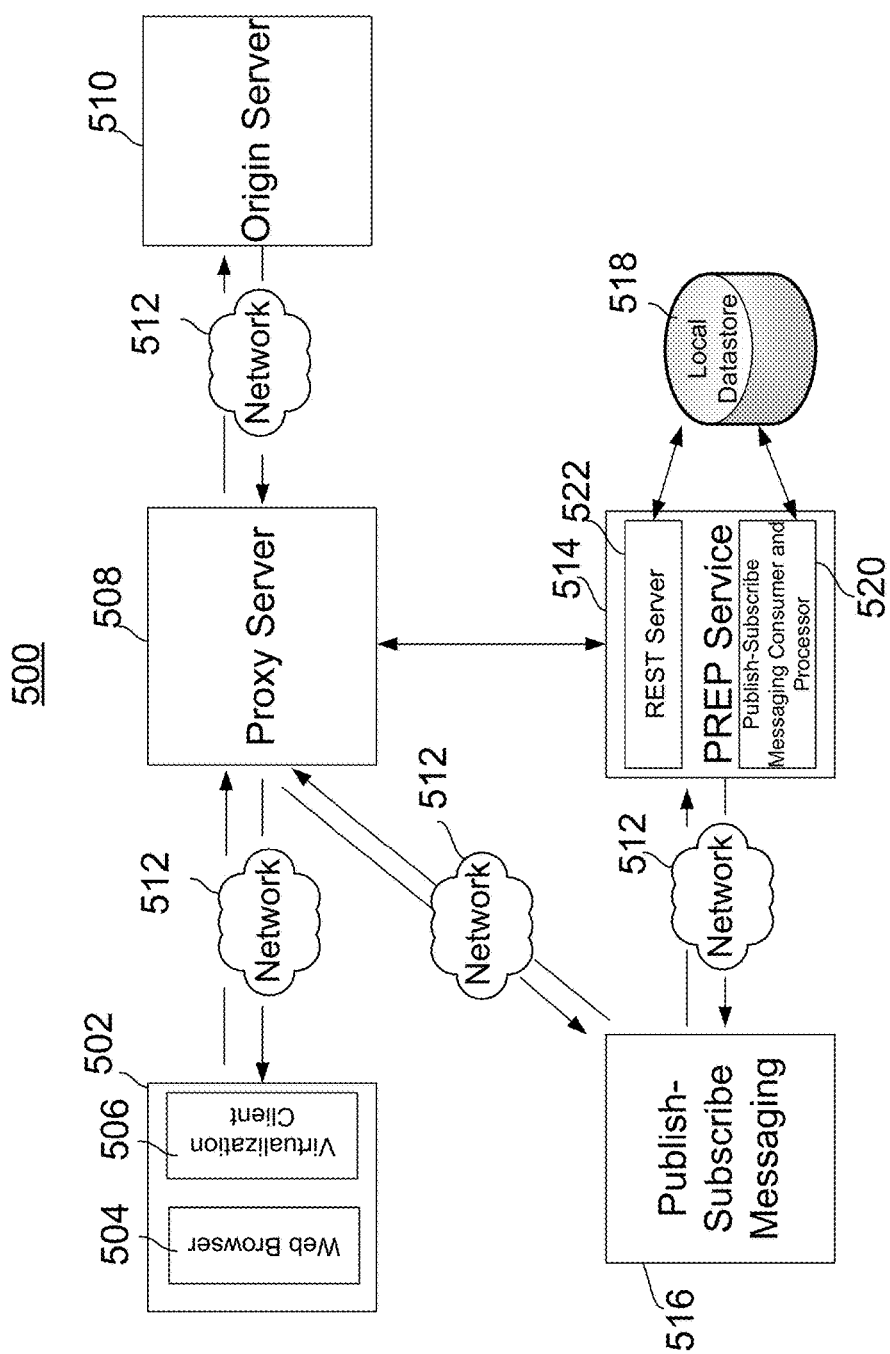
FIG. 5 is a block diagram 500 illustrating an embodiment of an optimized content delivery system for prefetching resources, each having a high probability of being a dependent resource that will need to be downloaded to the web browser when the web browser transits from the current webpage to one or more subsequent webpages.

FIG. 5 is a block diagram 500 illustrating an embodiment of an optimized content delivery system for prefetching resources, each having a high probability of being a dependent resource that will need to be downloaded to the web browser when the web browser transits from the current webpage to one or more subsequent webpages. Block diagram 500 illustrates a client device 502, a proxy server 508, and an origin server 510 communicating across networks 512. Networks 512 may be any combination of public or private networks, including intranets, local area networks (LANs), wide area networks (WANs), radio access networks (RANs), Wi-Fi networks, the Internet, and the like. Examples of client device 502 include laptop computers, desktop computers, tablet computers, smartphones, and other mobile devices. In some embodiments, proxy server 508 is a server that belongs to a content delivery network or content distribution network (CDN). In some embodiments, origin server 510 is a web publisher. Block diagram 500 further illustrates a PREP service server 514, a publish-subscribe messaging service 516, and a local datastore 518.

Client device 502 includes a web browser 504. Examples of web browser 504 include Internet Explorer, Google Chrome, Mozilla Firefox, Safari, and the like. In some embodiments, client device 502 further includes a virtualization client 506 (also referred to as a Nanovisor).

Virtualization client 506 and proxy server 508 work together as a client-server system for virtualizing the DOM of a web browser. Virtualization of the DOM of a web browser allows the client-server system to take control of the DOM for different kinds of optimizations while keeping the virtualization transparent to the web browser. A web browser accesses webpages and other information through a network. When a web browser sends any network messages onto the network that are related to the downloading of webpages or other information, the messages may either be intercepted and processed by virtualization client 506, or be directly received and processed by proxy server 508. Webpages or other information related to the webpages that are sent to web browser may be intercepted, filtered, processed, or provided by virtualization client 506 or proxy server 508. In addition, method API calls by a web browser or any JavaScript code which manipulate the objects in a DOM tree may be intercepted, processed, or modified by virtualization client 506. Virtualization client 506 may also manipulate the DOM tree by making the appropriate method API calls to the DOM tree. As a result, virtualization client 506 and proxy server 508 together create a virtualization engine for the DOM of a web browser. The virtualization engine may access and manipulate a DOM tree, including the creation, deletion, or update of nodes within the DOM tree.

Figure 6:
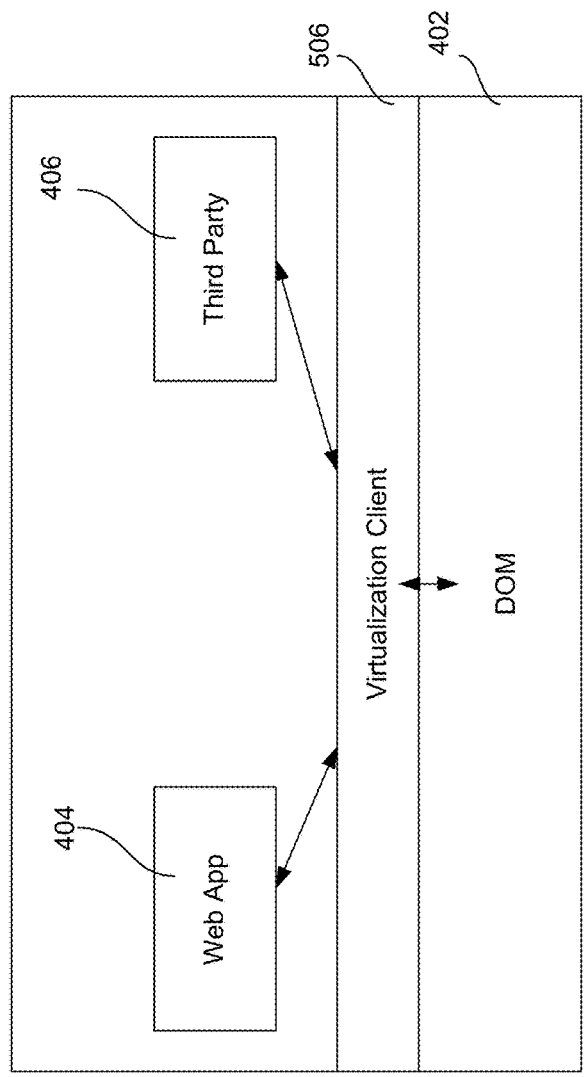
FIG. 6 illustrates that virtualization client 506 is above the DOM 402 of a web browser.

FIG. 6 illustrates that virtualization client 506 is above the DOM 402 of a web browser. Virtualization client 506 may intercept the DOM APIs that pass information or instructions between the DOM 402 and different types of scripts. Virtualization client 506 may supplant an intercepted DOM API with a new DOM API; for example, the new DOM API may selectively block the intercepted DOM API based on different criteria. The new DOM API may also modify the intercepted DOM API and pass a modified version of the intercepted DOM API to the DOM or the caller/user. The new DOM API may also trigger an alert in response to an intercepted DOM API.

According to some embodiments, virtualization client 506 may be configured to control access to the DOM 402 by intercepting requests to the DOM interface. In effect, virtualization client 506 serves as a virtualization layer to control access to the DOM interface. This virtualization may be facilitated by one or more wrapper methods/functions with respect to one or more of the APIs of the DOM (e.g., Document API interface of a webpage) that replace and wrap corresponding standard API methods/functions of the DOM (e.g., method API calls to create, delete or update elements in the DOM via a Document API interface are replaced with corresponding wrapper methods). For example, particular memory address locations identifying standard code of DOM API (e.g., Document API) methods/calls are in effect replaced with memory address locations of replacement wrapper methods/functions provided via virtualization client 506 by replacing standard API JavaScript getter and setter methods of objects of the API with a replacement/wrapper JavaScript getter and setter methods. In some embodiments, DOM core level 1 APIs for manipulating the DOM tree are supplanted by the equivalent interfaces provided via virtualization client 506. In this manner, virtualization client 506 is able to intercept requests for resources and modify the requests (e.g., transform/encode resource location identifier (e.g., URL) of a request) in a manner that is transparent to other processes running within the web browser 504 environment. In other words, virtualization client 506 ensures that any other processes running within the web browser only have access to the encoded resource identifiers and thus are unable to determine the original identity (e.g., original location identifier) of resources associated with the webpage. This virtualization of the DOM interface can be used by the virtualization client 506 to implement one or more client side optimizations of the webpage and, in particular, one or more client-side countermeasures to protect integrity of the webpage.

In some embodiments, virtualization client 506 may be injected into web browser 504 by proxy server 508 based on standards-based (e.g., HTML or JavaScript) procedures. For example, after proxy server 508 receives a request from web browser 504 requesting an HTML webpage file, proxy server 508 may parse the HTML webpage file, inject virtualization client 506 into the HTML webpage file, and then send the response back to web browser 504. For example, virtualization client 506 may be injected by adding JavaScript client code (e.g., <script src="nanovisor.js"></script>) in the head section of a webpage.

With continued reference to FIG. 5, block diagram 500 further illustrates a PREP service server 514, a publish-subscribe messaging system 516, and a local datastore 518. As shown in FIG. 5, proxy server 508 is separated from PREP service server 514, publish-sub scribe messaging system 516, and local datastore 518. However, in other embodiments, proxy server 508 may be integrated or collocated with some or all of these components of the system. PREP service server 514 includes a plurality of modules. In some embodiments, PREP service server 514 includes a publish-subscribe messaging consumer and processor 520 that interacts with publish-subscribe messaging service 516. PREP service server 514 further includes a REST (Representational State Transfer) server 522.

Figure 7:
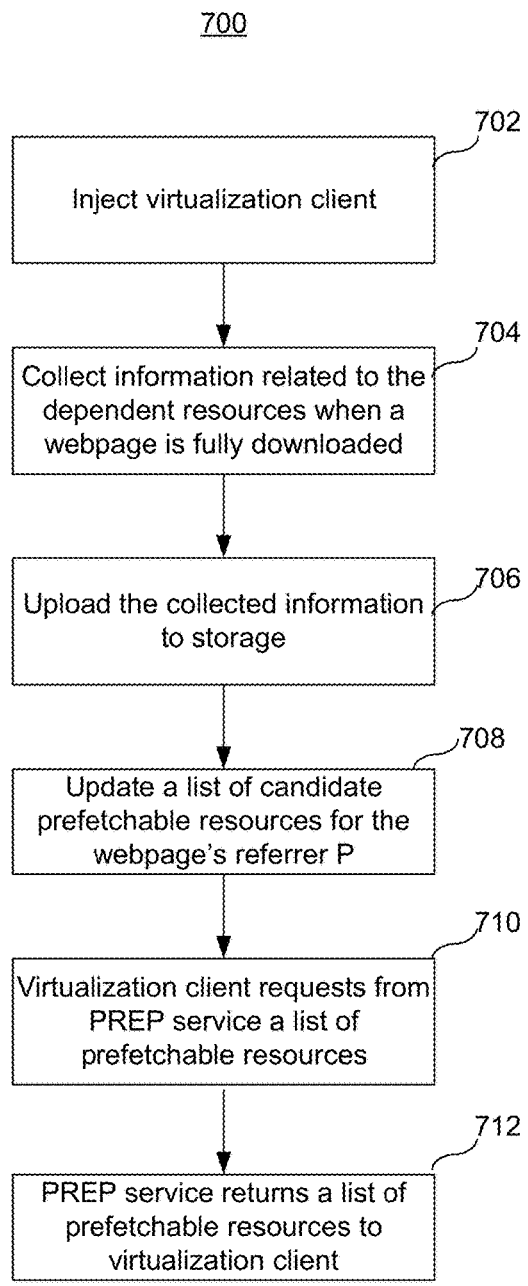
FIG. 7 illustrates an embodiment of a flow diagram of a process 700 for efficiently prefetching resources, each having a high probability of being a dependent resource that will need to be downloaded to the web browser when the web browser transits from the current webpage to a subsequent webpage.

FIG. 7 illustrates an embodiment of a flow diagram of a process 700 for efficiently prefetching resources, each having a high probability of being a dependent resource that will need to be downloaded to the web browser when the web browser transits from the current webpage to a subsequent webpage. In some embodiments, process 700 is performed by the system illustrated in FIG. 5.

At step 702, proxy server 508 injects virtualization client 506 into web browser 504. In some embodiments, virtualization client 506 may be injected into web browser 504 by proxy server 508 based on standards-based (e.g., HTML or JavaScript) procedures. For example, after proxy server 508 receives a request from web browser 504 requesting an HTML webpage file, proxy server 508 may parse the HTML webpage file, inject virtualization client 506 into the HTML webpage file, and then send the response back to web browser 504. For example, virtualization client 506 may be injected by adding JavaScript client code (e.g., <script src="nanovisor.js"></script>) in the head section of a webpage. Once web browser 504 receives the requested webpage file with the injected client code, virtualization client 506 begins to execute on client device 502, interacting with web browser 504 and proxy server 508.

At step 704, virtualization client 506 collects the information that enables the system to determine the prefetchable resources. The collected information includes the information related to the dependent resources that are downloaded when the web browser transits from one webpage to a second webpage and when the second webpage is fully downloaded. Each set of the collected information is also referred to as the webpage resource data, i.e., the resource data associated with the loading of a single webpage. Briefly, the webpage resource data includes a list of dependent resources that are associated with a given webpage. This list of dependent resources includes the resources that the web browser is directed by the webpage to download to the client device. The webpage resource data may also include the downloading timing information corresponding to each resource on the list. The timing information may be used to measure the time it takes to fetch each resource on a webpage. For example, the PerformanceResourceTiming interface may be used to retrieve detailed network timing data regarding the loading of an application's resources. The timing metrics may be used to determine, for example, the length of time it takes to fetch a specific resource, such as an image or script.

In some embodiments, virtualization client 506 waits until a current webpage has completely loaded all its content (including all dependent resources, such as images, script files, CSS files, etc.), then virtualization client 506 uses the PerformanceResourceTiming API (application program interface) to collect the webpage resource data. The webpage resource data includes the identification of the current webpage, such as the URL of the webpage. The webpage resource data also includes the referrer URL, which is the URL of the last webpage the web browser was on. In other words, the referring web content is the last webpage that the web browser was on, and the referred web content is the current webpage that the web browser is on. The webpage resource data may also include the type of the web browser, such as Internet Explorer, Firefox, or Google Chrome. The webpage resource data also includes a list of dependent resources that are associated with the current webpage. The webpage resource data further includes the start and end loading time of each of the dependent resource. The start time is the time when the request for a dependent resource is sent, and the end time is the time when the dependent resource is successfully downloaded. The difference between the start time and the end time may be used to measure the time it takes to fetch a particular resource associated with the current webpage. The webpage resource data may further include the session ID. A session ID is an identifier that a website assigns a specific user for the duration of that user's visit (session). The session ID may be used to group together a plurality of webpages that a user has visited during a browsing session.

It should be recognized that the webpage resource data may be collected each time a different webpage is loaded to completion, such that the webpage resource data of different webpages that different users have clicked through may be collected and updated over time.

At step 706, virtualization client 506 uploads the webpage resource data for storage. In some embodiments, virtualization client 506 uploads the collected information corresponding to a single webpage to storage as a single batch. In some other embodiments, virtualization client 506 accumulates the collected information corresponding to a plurality of webpages before the accumulated collected information is uploaded to storage as a single batch.

In some embodiments, the webpage resource data is uploaded to a publish-subscribe messaging service 516, such as Apache Kafka or RabbitMQ. Apache Kafka is a type of distributed publish-subscribe messaging system. Virtualization client 506 uploads or publishes the webpage resource data to Apache Kafka and the data may be consumed by the PREP back-end, which is the PREP service server 514. In some embodiments, the uploading of the webpage resource data from virtualization client 506 to Apache Kafka is routed through Nginx on proxy server 508. Nginx is an example of a HTTP reverse proxy, which can be deployed by CDNs to cache, serve, and route data. In some embodiments, instead of uploading the collected information to an outside or third party service vendor, such as Apache Kafka, the collected information is uploaded to proxy server 508 and/or PREP service server 514 for internal storage.

The webpage resource data may be uploaded and exported by virtualization client 506 for storage using different data structures or formats. The HAR specification defines an archival format for HTTP transactions that can be used by a web browser to export detailed performance data about webpages it loads. In some embodiments, a HAR object is used to store the webpage resource data corresponding to a single webpage pageload.

Using the webpage resource data collected over time and across many client devices or users, PREP service server 514 may maintain for each webpage P a list of dependent resources that have previously been downloaded due to the N most recent occurrences of the event of webpage P fully transiting to a different webpage, where N is a configurable parameter. In other words, for any given webpage P, the list of dependent resources are the resources that have appeared in webpage(s) that have webpage P as the HTTP referrer. The HTTP referrer of a given webpage is another webpage that the user was on prior to transiting to the given webpage.

In some embodiments, the lists of dependent resources are stored in a (key, value) store in local datastore 518. The key is the webpage's URL (denoted here as URL'), and the value is the list of dependent resources [($R_1$, $C_1$), ($R_2$, $C_2$), . . . ($R_M$, $C_M$)], where $R_i$ is the URL of the $i^{th}$ dependent resource, and $C_i$ is the reference count of the occurrences of the $i^{th}$ dependent resource in all of the webpages having webpage P as the HTTP referrer. More specifically, the reference count $C_i$ keeps track of the number of times dependent resource $R_i$ has appeared in a webpage that has webpage P as the HTTP referrer. The reference count may be implemented as an actual number count. Alternatively, the reference count may be implemented as a circular bit array of size N in which the number of bits that are set to one represents the reference count.

Figure 8:
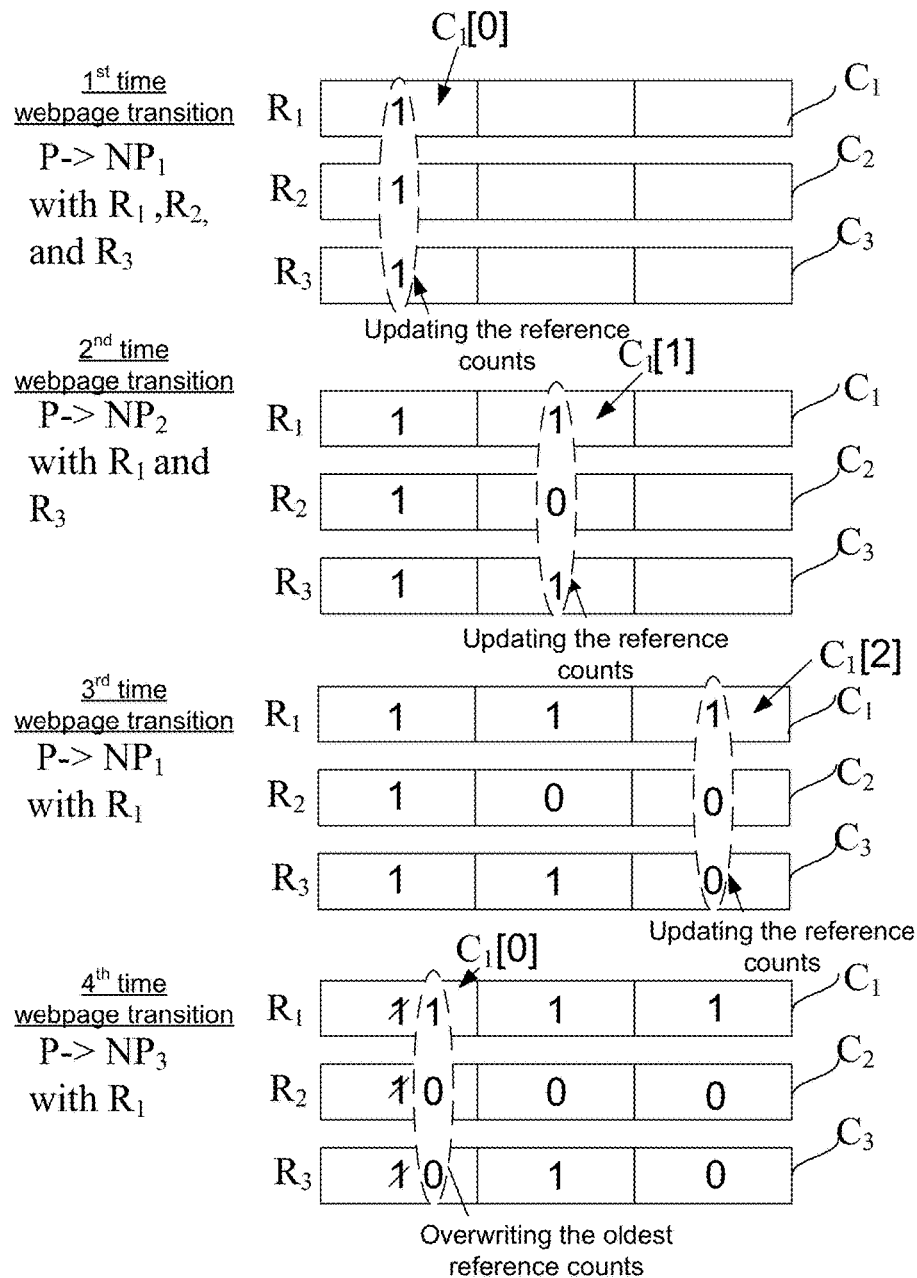
FIG. 8 illustrates a simple example of how the list of dependent resources for webpage P is being updated.

FIG. 8 illustrates a simple example of how the list of dependent resources for webpage P is being updated. In this example, N=3; however, N may be any number greater than one, and N may be a number substantially greater than three. The first time when webpage P transits to another page, webpage P transits to webpage $NP_1$, and webpage $NP_1$ has three dependent resources $R_1$, $R_2$, and $R_3$. Therefore, ($R_1$, $C_1$), ($R_2$, $C_2$), and ($R_3$, $C_3$) are added, and $C_1[0]$, $C_2[0]$, and $C_3[0]$ are all set to one to indicate that $R_1$, $R_2$, and $R_3$ each appears in webpage $NP_1$.

The second time when webpage P transits to another page, webpage P transits to webpage $NP_2$, and webpage $NP_2$ has only two dependent resources $R_1$ and $R_3$. Therefore, $C_1[1]$, $C_2[1]$, and $C_3[1]$ are set to bits 1, 0, and 1, respectively, to indicate that $R_1$ and $R_3$ each appears in webpage $NP_2$, but $R_2$ does not.

The third time when webpage P transits to another page, webpage P transits to webpage $NP_1$ again, but unlike the first time when webpage P transits to $NP_1$, webpage $NP_1$ now has only one dependent resource $R_1$. Therefore, $C_1[2]$, $C_2[2]$, and $C_3[2]$ are set to bits 1, 0, and 0, respectively, to indicate that only R1 appears in webpage $NP_1$ this time.

The fourth time when webpage P transits to another page, webpage P transits to webpage $NP_3$, and webpage $NP_3$ has only one dependent resource $R_1$. Since N=3, the fourth transition overwrites the first transition, and as a result $C_1[0]$, $C_2[0]$, and $C_3[0]$ are overwritten and are now set to bits 1, 0, and 0, respectively, to indicate that only $R_1$ appears in webpage $NP_3$.

Also shown above, the list [($R_1$, $C_1$), ($R_2$, $C_2$), . . . ($R_M$, $C_M$)] provides a list of candidate prefetchable resources that may be prefetched after the web browser has finished loading webpage P, but is still waiting for a user's action to transit to the next webpage. The list also provides the probability of a candidate resource being present in the next webpage. In particular, the candidate resource that has a high percentage of the bits in the reference count bit array set to one has a high probability of being present in the next webpage. Therefore, a candidate resource may be selected as a prefetchable resource when the percentage of one bits is above a predetermined threshold.

For example, as shown in FIG. 8, the reference count circular bit array keeps track of both how often a resource appears and when it last appeared. Therefore, the reference count big arrays of the dependable resources may be used to determine which candidate dependent resources should be prefetched ahead of time based on an estimate of the probability of occurrence. If the probability of occurrence is below a predetermined threshold, then the candidate dependent resource should not be selected as a prefetchable resource. Different configurable criteria and threshold levels may be used to determine whether a candidate dependent resource should be prefetched. For example, if an array is filled with many one bits and only a few zero bits (e.g., the percentage of one bits is above a certain threshold), then the resource has a high probability of being a dependent resource that will need to be downloaded to the web browser when the web browser transits from the webpage P to a subsequent webpage, and is therefore a resource that can be prefetched ahead of time. On the other hand, if the latest bit values written into the array are all zero bits (e.g., the latest ten percent of the bits written into the array are all zeros), then the resource has probably been recently removed from the webpages, and is therefore assigned a low probability of occurrence and deemed not a resource that should be prefetched ahead of time, even if the array has a high percentage of one bits.

With continued reference to FIG. 7, at step 708, PREP service server 514 continuously updates the (key, value) store based on the webpage resource data collected by step 704. For example, publish-subscribe messaging consumer and processor 520 in PREP service server 514 may read a HAR object from publish-subscribe messaging system 516 after each webpage transition and use the information stored in the object to update the (key, value) store in local datastore 518. For example, a HAR object storing the webpage resource data includes a referrer URL. This referrer URL becomes the key (webpage P's URL), and the list of dependent resources in the HAR object is used to update the key's value [($R_1$, $C_1$), ($R_2$, $C_2$), . . . ($R_M$, $C_M$)]. In some embodiments, all browser types share the same (key, value) store. In some embodiments, each browser type (e.g., Internet Explorer, Firefox, and Google Chrome) has a different (key, value) store. In some embodiments, the same (key, value) store may be used to service a plurality of client devices 502. In some embodiments, different (key, value) stores may be used to service different groups of client devices 502.

In some embodiments, the value of the (key, value) is a serialized Proto object. For example, a Google protobuf format may be used to store the object. The object is serialized into a binary object before storing into the datastore for increased efficiency. As shown in FIG. 5, local datastore 518 is separated from PREP service server 514. However, local datastore 518 may also be collocated on the same machine as PREP service server 514.

It should be recognized that only cacheable resources should be prefetched. Therefore, any non-cacheable resources should be filtered and not be considered as prefetchable resources. The filtering may be performed at different stages of process 700. For example, the filtering may be performed at step 708. In some embodiments, a heuristic is used to determine whether a request for a resource was served from a browser cache by monitoring the HTTP response time corresponding to the resource. The start and end loading time of a dependent resource may be found in the HAR objects in publish-subscribe messaging system 516. They may also be found in the (key, value) store in local datastore 518. In some embodiments, the HTTP response time is estimated as the difference between the start and end loading time minus the DNS lookup and connection setup times. The estimated HTTP response time may be compared to a predetermined threshold. If the HTTP response time is smaller than the predetermined threshold, then the resource is deemed to have been served out of the browser cache, and is therefore a cacheable resource.

With continued reference to FIG. 7, at step 710, virtualization client 506 requests PREP service server 514 to provide a list of prefetchable resources that can be prefetched after webpage P has finished loading. In some embodiments, PREP service server 514 includes a REST (Representational State Transfer) server 522. For example, virtualization client 506 may make a XHR request (within the customer domain), which will be routed by proxy server 508 to REST server 522.

At step 712, PREP service server 514 returns a list of prefetchable resources to virtualization client 506 in response to the request at step 710. For example, REST server 514 responds with a list of prefetchable resources (e.g., their URLs) as a cacheable JSON (JavaScript Object Notation) object that may be cached in proxy server 508. In some embodiments, the cacheable JSON object has a time to live (TTL) of at least 24 hours. Therefore, most requests from virtualization client 506 are expected to be intercepted and served by proxy server 508. After virtualization client 506 receives the list of prefetchable resources, virtualization client 506 may then prefetch those resources. The resources may be prefetched using different mechanisms.

For example, the URLs of the resources may be specified by using one of the following tags, <link rel=preload>, <link rel=prefetch> or <link rel=subresource>. These tags each prefetches resources; they differ only in the priority with which the prefetching operation is scheduled. One way to prefetch resources is by using the HTTP Link: header to specify the resources to prefetch. In HTTP2, the Server PUSH functionality may be used. This functionality allows the server to push resources to the client, even if they are not explicitly requested by the client. Such resources are then cached in the browser cache for a subsequent re-use. Another mechanism does not rely on the browser cache, but instead makes use of the browser LocalStorage functionality. Unlike the browser cache (whose eviction operations are hidden from the application), LocalStorage allows an application to have complete control over what is stored in the storage and what is evicted from it. To employ this mechanism, the application uses the Nanovisor JavaScript library to explicitly download prefetchable resources and store them in LocalStorage. Subsequent requests for these resources can be intercepted by a browser ServiceWorker (launched by the Nanovisor), which can check if the request is present locally within LocalStorage, and if so, the requests may be served locally. In other words, ServiceWorkers can be utilized as a "local" proxy on the client. This standards-based mechanism to implement local caching on the browser is gaining general acceptance.

The list of prefetchable resources may be assembled in response to the request sent from virtualization client 506 at step 710. When the PREP back-end receives the request, it may look up a webpage P's list of candidate resources in the (key, value) store, and select a subset of the candidate resources on the list to form the list of prefetchable resources. The selection of the subset may be based on one or more of the criteria or threshold levels described above.

Apart from considering the probability of occurrence, some embodiments use additional criteria to select the subset of the candidate resources to form the list of prefetchable resources. For example, the criticality of a resource within the page load process—i.e., whether it takes a relatively long time to download the resource—may be a factor. Another example criterion is whether the resource is a resource on a critical path. A critical path is a sequence of resources that are sequentially downloaded, for example due to inter-dependency, and that takes the longest total time to download. By prefetching the resources on a critical path, the downloading wait time experienced by the user can be reduced.

Figure 9:
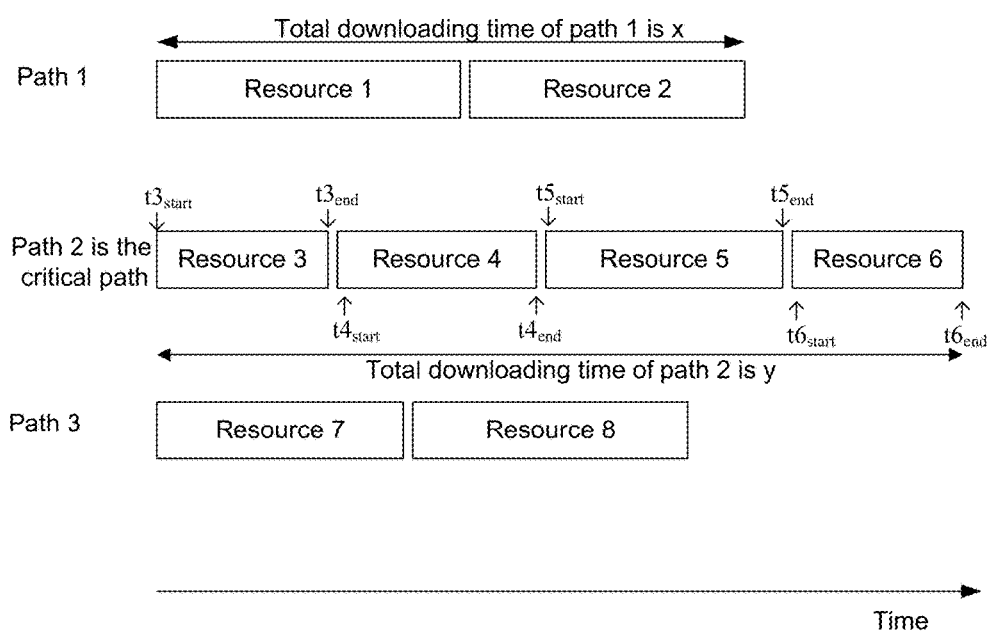
FIG. 9 illustrates an exemplary timing diagram of different resources associated with a webpage are being downloaded.

FIG. 9 illustrates an exemplary timing diagram of different resources associated with a webpage are being downloaded. The downloading of resource 1 and resource 2 forms path 1. The downloading of resources 3, 4, 5, and 6 forms path 2. The downloading of resource 7 and resource 8 forms path 3. Each of the paths downloads in parallel. Path 2 is the critical path among the three paths because its total downloading time is the longest. By prefetching the resources on path 2, the critical path, the total downloading time is reduced from y to a shorter amount x, thereby improving user's experience. The timing diagram for determining the different paths and the resources belonging to the different paths may be constructed based on the webpage resource data (start and end loading times of the resources) collected in step 704 of process 700. Different heuristics may be used to determine which resources form a single path. In the present example, the heuristic used is that the start time of a subsequent resource in the path should be within a threshold time period from the end time of the preceding resource in the path. For example, resources 3, 4, 5, and 6 are determined as being downloaded as a sequence and forming a path because the start time of each resource (except resource 3) is within a threshold time period from the end time of its preceding resource.

Process 700 in FIG. 7 computes a list of prefetchable resources by considering the immediate transitions from a given webpage. In some embodiments, a path of transitions may be considered. In process 700, the probability of a resource occurring in the next transition out of $P_j$, i.e., probability $Pr(R_i, P_j)$, is used to determine whether the resource should be prefetched. In some embodiments, the probability of a resource occurring in the next transition after having visited a previous set of K pages, i.e., $Pr(R_i, (S_j, S_{j-1}, \ldots S_{j-k}))$, may be used to determine whether resource should be prefetched.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for identifying prefetchable resources, comprising:

receiving a plurality of sets of information, wherein each set of information indicates dependent resources of a corresponding referred web content, wherein each set of information is collected in response to the corresponding referred web content having been loaded on one of one or more client devices;

using the received sets of information associated with the corresponding referred web content to update a list of candidate prefetchable resources for a referring web content that refers to the corresponding referred web content;

receiving, from a requestor on a client device, a request requesting for a list of prefetchable resources, wherein the request is associated with loading the referring web content on the client device;

selecting one or more resources from the list of candidate prefetchable resources as prefetchable resources associated with the referring web content based on one or more criteria, comprising:
  for a resource on the list of candidate prefetchable resources:
    determining a probability of the resource being a dependent resource that will need to be downloaded to a web browser of the client device when the web browser transits from the referring web content to one or more subsequent referred web content; and
    comparing the probability with a predetermined threshold percentage and selecting the resource in the event that the probability is above the predetermined threshold percentage, wherein one of the one or more criteria requires that the probability be above the predetermined threshold percentage; and
sending to the requestor one or more identifiers identifying the one or more selected resources.

2. The method of claim 1, further comprising:
for each of the one or more client devices:
  injecting a virtualization client on a web browser running on the client device by adding JavaScript client code to a webpage, wherein the webpage is sent to the web browser, and wherein each set of information collected on the client device is collected by the virtualization client, and wherein the virtualization client comprises the requestor.

3. The method of claim 1, wherein each set of information is collected after the webpage has completed loading.

4. The method of claim 1, wherein each set of information is collected by accessing the PerformanceResourceTiming API.

5. The method of claim 1, wherein each set of information includes identifiers of the dependent resources, a start and an end loading time corresponding to each dependent resource, and an identifier of the referring web content.

6. The method of claim 1, wherein the plurality of sets of information is received from a publish-subscribe messaging system that stores the sets of information sent from the one or more client devices.

7. The method of claim 1, further comprising: filtering a resource from being selected as a prefetchable resource in the event that the resource is determined to be a non-cacheable resource.

8. The method of claim 1, further comprising:
determining, among the list of candidate prefetchable resources for the referring web content, a plurality of resources that forms a critical path, wherein the plurality of resources forming the critical path comprises a sequence of resources that are sequentially downloaded and that take the longest total time to download, and wherein the total time to download the plurality of resources forming the critical path is determined based on the sets of information.

9. The method of claim 8, wherein selecting the one or more resources further comprises:
for a resource on the list of candidate prefetchable resources:
  determining whether the resource is one of the resources forming the critical path, and selecting the resource in the event that the resource is one of the resources forming the critical path, wherein one of the one or more criteria requires that the selected resource be forming the critical path.

10. A system for identifying prefetchable resources, comprising:
a processor configured to:
  receive a plurality of sets of information, wherein each set of information indicates dependent resources of a corresponding referred web content, wherein each set of information is collected in response to the corresponding referred web content having been loaded on one of one or more client devices;
  use the received sets of information associated with the corresponding referred web content to update a list of candidate prefetchable resources for a referring web content that refers to the corresponding referred web content;
  receive, from a requestor on a client device, a request requesting for a list of prefetchable resources, wherein the request is associated with loading the referring web content on the client device
  select one or more resources from the list of candidate prefetchable resources as prefetchable resources associated with the referring web content based on one or more criteria, comprising:
    for a resource on the list of candidate prefetchable resources:
      determining a probability of the resource being a dependent resource that will need to be downloaded to a web browser of the client device when the web browser transits from the referring web content to one or more subsequent referred web content and
      comparing the probability with a predetermined threshold percentage and selecting the resource in the event that the probability is above the predetermined threshold percentage, wherein one of the one or more criteria requires that the probability be above the predetermined threshold percentage; and
    send to the requestor one or more identifiers identifying the one or more selected resources; and
a memory coupled to the processor and configured to provide the processor with instructions.

11. The system of claim 10, the processor is further configured to:
for each of the one or more client devices:
  inject a virtualization client on a web browser running on the client device by adding JavaScript client code to a webpage, wherein the webpage is sent to the web browser, and wherein each set of information collected on the client device is collected by the virtualization client, and wherein the virtualization client comprises the requestor.

12. The system of claim 10, wherein each set of information is collected after the webpage has completed loading.

13. The system of claim 10, wherein each set of information is collected by accessing the PerformanceResourceTiming API.

14. The system of claim 10, wherein each set of information includes identifiers of the dependent resources, a start and an end loading time corresponding to each dependent resource, and an identifier of the referring web content.

15. The system of claim 10, wherein the plurality of sets of information is received from a publish-subscribe messaging system that stores the sets of information sent from the one or more client devices.

16. The system of claim 10, wherein the processor is further configured to:

filter a resource from being selected as a prefetchable resource in the event that the resource is determined to be a non-cacheable resource.

17. The system of claim 10, wherein the processor is further configured to:
determine, among the list of candidate prefetchable resources for the referring web content, a plurality of resources that forms a critical path, wherein the plurality of resources forming the critical path comprises a sequence of resources that are sequentially downloaded and that take the longest total time to download, and wherein the total time to download the critical path is determined based on the sets of information.

18. The system of claim 17, wherein selecting the one or more resources further comprises:
for a resource on the list of candidate prefetchable resources:
determining whether the resource is one of the resources forming the critical path, and selecting the resource in the event that the resource is one of the resources forming the critical path, wherein one of the one or more criteria requires that the selected resource be forming the critical path.

19. A computer program product for identifying prefetchable resources, the computer program product being embodied in a tangible non-transitory computer readable storage medium and comprising computer instructions for:
receiving a plurality of sets of information, wherein each set of information indicates dependent resources of a corresponding referred web content, wherein each set of information is collected in response to the corresponding referred web content having been loaded on one of one or more client devices;
using the received sets of information associated with the corresponding referred web content to update a list of candidate prefetchable resources for a referring web content that refers to the corresponding referred web content;
receiving, from a requestor on a client device, a request requesting for a list of prefetchable resources, wherein the request is associated with loading the referring web content on the client device;
selecting one or more resources from the list of candidate prefetchable resources as prefetchable resources associated with the referring web content based on one or more criteria, comprising:
for a resource on the list of candidate prefetchable resources:
determining a probability of the resource being a dependent resource that will need to be downloaded to a web browser of the client device when the web browser transits from the referring web content to one or more subsequent referred web content and
comparing the probability with a predetermined threshold percentage and selecting the resource in the event that the probability is above the predetermined threshold percentage, wherein one of the one or more criteria requires that the probability be above the predetermined threshold percentage; and
sending to the requestor one or more identifiers identifying the one or more selected resources.

20. A method for identifying prefetchable resources, comprising:
receiving a plurality of sets of information, wherein each set of information indicates dependent resources of a corresponding referred web content, wherein each set of information is collected in response to the corresponding referred web content having been loaded on one of one or more client devices;
using the received sets of information associated with the corresponding referred web content to update a list of candidate prefetchable resources for a referring web content that refers to the corresponding referred web content;
determining, among the list of candidate prefetchable resources for the referring web content, a plurality of resources that forms a critical path, wherein the plurality of resources forming the critical path comprises a sequence of resources that are sequentially downloaded and that take the longest total time to download, and wherein the total time to download the plurality of resources forming the critical path is determined based on the sets of information;
receiving, from a requestor on a client device, a request requesting for a list of prefetchable resources, wherein the request is associated with loading the referring web content on the client device;
selecting one or more resources from the list of candidate prefetchable resources as prefetchable resources associated with the referring web content based on one or more criteria; and
sending to the requestor one or more identifiers identifying the one or more selected resources.

21. The method of claim 20, wherein selecting the one or more resources further comprises:
for a resource on the list of candidate prefetchable resources:
determining whether the resource is one of the resources forming the critical path, and selecting the resource in the event that the resource is one of the resources forming the critical path, wherein one of the one or more criteria requires that the selected resource be forming the critical path.

22. A system for identifying prefetchable resources, comprising:
a processor configured to:
receive a plurality of sets of information, wherein each set of information indicates dependent resources of a corresponding referred web content, wherein each set of information is collected in response to the corresponding referred web content having been loaded on one of one or more client devices;
use the received sets of information associated with the corresponding referred web content to update a list of candidate prefetchable resources for a referring web content that refers to the corresponding referred web content;
determine, among the list of candidate prefetchable resources for the referring web content, a plurality of resources that forms a critical path, wherein the plurality of resources forming the critical path comprises a sequence of resources that are sequentially downloaded and that take the longest total time to download, and wherein the total time to download the plurality of resources forming the critical path is determined based on the sets of information;
receive, from a requestor on a client device, a request requesting for a list of prefetchable resources, wherein the request is associated with loading the referring web content on the client device select one or more resources from the list of candidate prefetchable resources as prefetchable resources associated with the referring web content based on one or more criteria; and send to the requestor one or more identifiers identifying the one or more selected resources; and a memory coupled to the processor and configured to provide the processor with instructions.

23. The system of claim 22, wherein selecting the one or more resources further comprises:

for a resource on the list of candidate prefetchable resources:

determining whether the resource is one of the resources forming the critical path, and selecting the resource in the event that the resource is one of the resources forming the critical path, wherein one of the one or more criteria requires that the selected resource be forming the critical path.

24. A computer program product for identifying prefetchable resources, the computer program product being embodied in a tangible non-transitory computer readable storage medium and comprising computer instructions for:

receiving a plurality of sets of information, wherein each set of information indicates dependent resources of a corresponding referred web content, wherein each set of information is collected in response to the corresponding referred web content having been loaded on one of one or more client devices;

using the received sets of information associated with the corresponding referred web content to update a list of candidate prefetchable resources for a referring web content that refers to the corresponding referred web content;

determining, among the list of candidate prefetchable resources for the referring web content, a plurality of resources that forms a critical path, wherein the plurality of resources forming the critical path comprises a sequence of resources that are sequentially downloaded and that take the longest total time to download, and wherein the total time to download the plurality of resources forming the critical path is determined based on the sets of information;

receiving, from a requestor on a client device, a request requesting for a list of prefetchable resources, wherein the request is associated with loading the referring web content on the client device;

selecting one or more resources from the list of candidate prefetchable resources as prefetchable resources associated with the referring web content based on one or more criteria; and sending to the requestor one or more identifiers identifying the one or more selected resources.

* * * * *

UNITED STATES PATENT AND TRADEMARK OFFICE
CERTIFICATE OF CORRECTION

PATENT NO. : 10,291,738 B1
APPLICATION NO. : 15/412716
DATED : May 14, 2019
INVENTOR(S) : Jaiswal et al.

Page 1 of 1

It is certified that error appears in the above-identified patent and that said Letters Patent is hereby corrected as shown below:

In the Claims

In Column 14, Claim 10, Line 30, after "content" insert --;--.
In Column 15, Claim 19, Line 54, after "content" insert --;--.

Signed and Sealed this
Twelfth Day of May, 2020

Andrei Iancu
*Director of the United States Patent and Trademark Office*